(12) United States Patent
Okino et al.

(10) Patent No.: US 8,097,351 B2
(45) Date of Patent: Jan. 17, 2012

(54) MAGNETIC RECORDING APPARATUS

(75) Inventors: Takeshi Okino, Yokohama (JP); Seiji Morita, Yokohama (JP); Yoshiyuki Kamata, Tokyo (JP); Satoshi Shirotori, Fuchu (JP); Masatoshi Sakurai, Tokyo (JP); Hiroaki Nakamura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 871 days.

(21) Appl. No.: 11/341,849

(22) Filed: Jan. 30, 2006

(65) Prior Publication Data

US 2006/0172155 A1    Aug. 3, 2006

(30) Foreign Application Priority Data

Feb. 3, 2005    (JP) .................................. 2005-027795

(51) Int. Cl.
*G11B 5/66* (2006.01)
(52) U.S. Cl. .............................. 428/826; 360/48; 360/49
(58) Field of Classification Search .................. None
See application file for complete search history.

(56) References Cited

U.S. PATENT DOCUMENTS

| | | | |
|---|---|---|---|
| 3,286,251 A | 11/1966 | Rendler et al. | |
| 5,274,510 A | 12/1993 | Sugita et al. | |
| 5,587,850 A | 12/1996 | Ton-that | |
| 5,600,506 A | 2/1997 | Baum et al. | |
| 5,875,083 A | 2/1999 | Oniki et al. | |
| 6,014,296 A * | 1/2000 | Ichihara et al. | 360/135 |
| 6,424,479 B1 | 7/2002 | Hayashi | |
| 6,433,950 B1 | 8/2002 | Liikanen | |
| 6,529,341 B1 * | 3/2003 | Ishida et al. | 360/48 |
| 6,667,849 B2 | 12/2003 | Sasaki et al. | |
| 6,805,966 B1 | 10/2004 | Formato et al. | |
| 6,877,343 B2 * | 4/2005 | Watanabe et al. | 65/61 |
| 6,961,203 B1 | 11/2005 | Baker | |
| 6,967,798 B2 * | 11/2005 | Homola et al. | 360/48 |
| 7,031,086 B2 * | 4/2006 | Nishida et al. | 360/48 |
| 7,035,036 B2 | 4/2006 | Shimomura et al. | |
| 7,147,790 B2 | 12/2006 | Wachenschwanz et al. | |
| 7,150,844 B2 | 12/2006 | Deeman et al. | |
| 7,214,624 B2 * | 5/2007 | Fujita et al. | 438/706 |
| 7,319,568 B2 | 1/2008 | Okino et al. | |

(Continued)

FOREIGN PATENT DOCUMENTS

JP    2000-339670    12/2000

(Continued)

OTHER PUBLICATIONS

U.S. Appl. No. 11/182,065.

(Continued)

*Primary Examiner* — Holly Rickman
(74) *Attorney, Agent, or Firm* — Nixon & Vanderhye P.C.

(57) ABSTRACT

A magnetic recording apparatus has a magnetic recording media including a substrate and a magnetic layer containing magnetic patterns on the substrate, the magnetic layer including data zones to constitute recoding tracks and servo zones, the magnetic patterns of the servo zones being used as address bits, and a magnetic head configured to read signals from the magnetic recording media while flying over the magnetic recording media, in which, in a case where two magnetic patterns used as address bits on the servo zones corresponding to two adjacent recording tracks are arranged in such a manner that one corner of one magnetic pattern is closest to one corner of the other magnetic pattern, the corners of the two magnetic patterns are substantially separated from each other.

3 Claims, 8 Drawing Sheets

U.S. PATENT DOCUMENTS

2003/0063403 A1    4/2003    Nishikawa et al.
2004/0101713 A1    5/2004    Wachenschwanz et al.

FOREIGN PATENT DOCUMENTS

| | | |
|---|---|---|
| JP | 2001-143257 | 5/2001 |
| JP | 2001-312819 | 11/2001 |
| JP | 2003-141715 | 5/2003 |
| JP | 2004-110896 | 4/2004 |
| JP | 2004-265486 | 9/2004 |
| JP | 2006-031851 | 2/2006 |

OTHER PUBLICATIONS

Office Action in Japanese Application 2005-027795 dated Mar. 3, 2008 and English-language translation thereof.

* cited by examiner

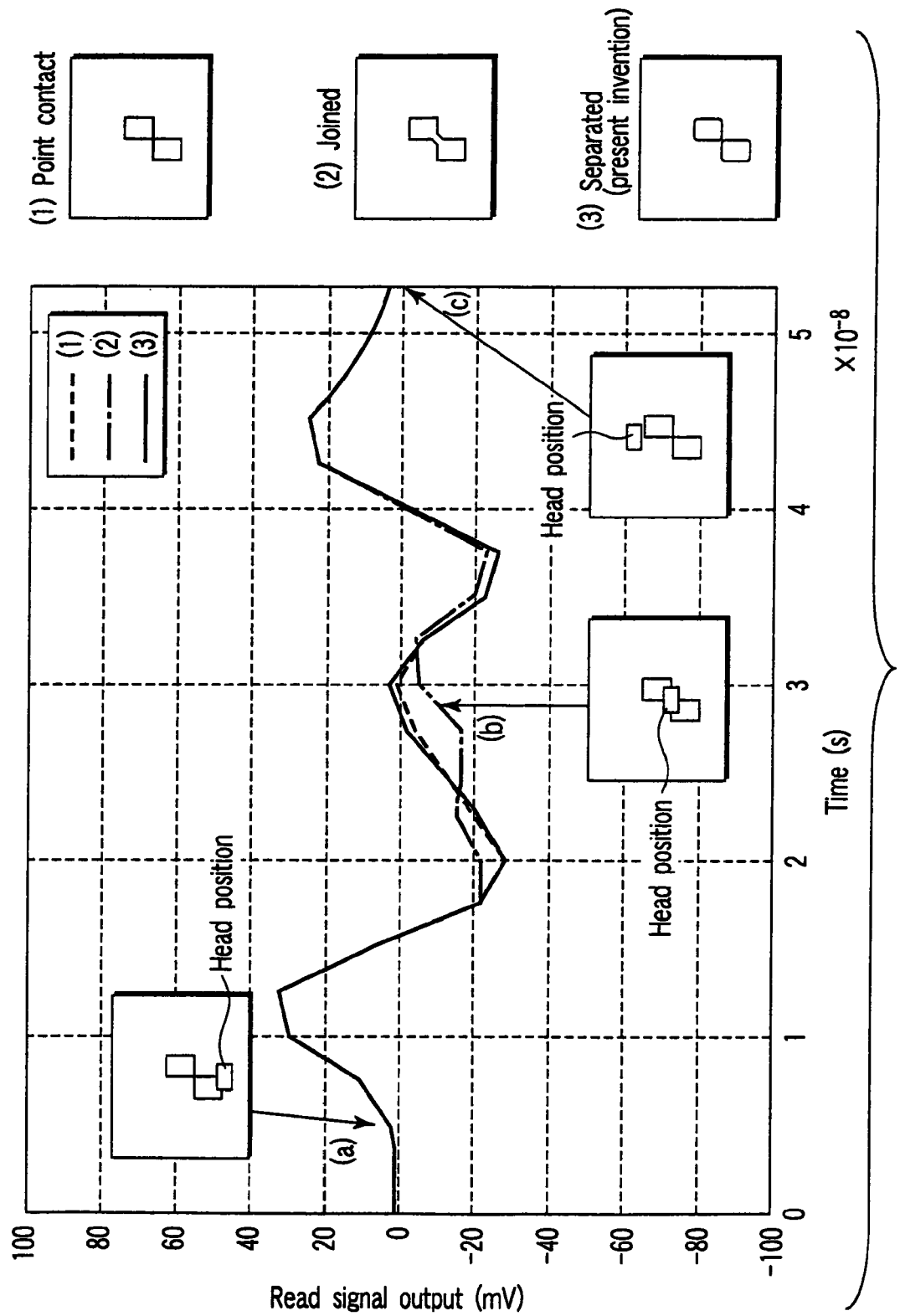
F I G. 4

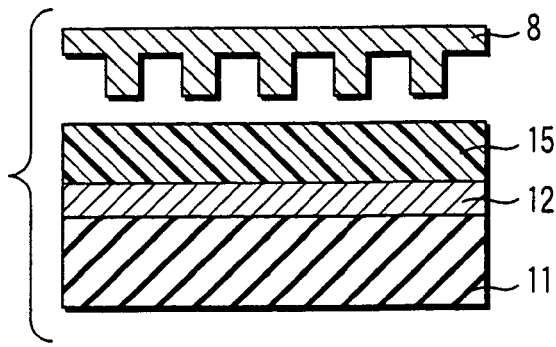
F I G. 10A
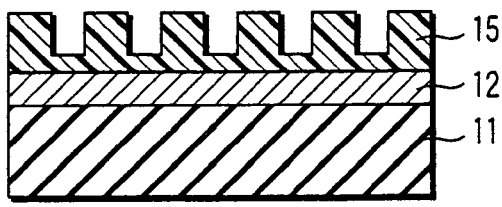
F I G. 10B
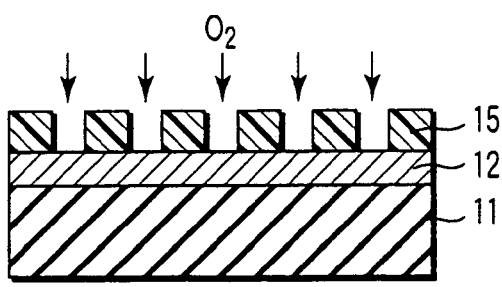
F I G. 10C
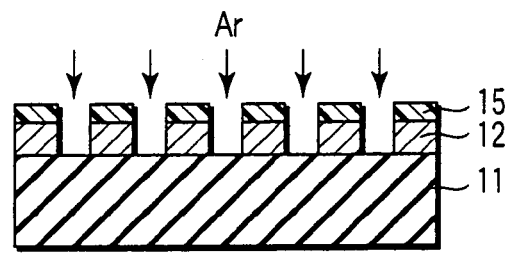
F I G. 10D
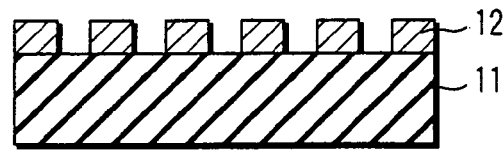
F I G. 10E
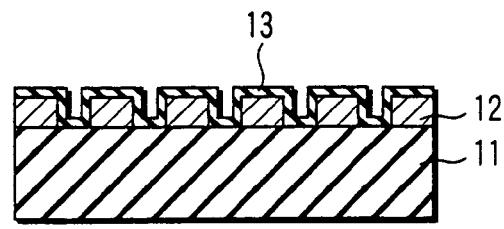
F I G. 10F

MAGNETIC RECORDING APPARATUS

CROSS-REFERENCE TO RELATED APPLICATIONS

This application is based upon and claims the benefit of priority from prior Japanese Patent Application No. 2005-027795, filed Feb. 3, 2005, the entire contents of which are incorporated herein by reference.

BACKGROUND OF THE INVENTION

1. Field of the Invention

The present invention relates to a magnetic recording media having discrete tracks, a magnetic recording apparatus having the magnetic recording media, and a stamper used to manufacture the magnetic recording media.

2. Description of the Related Art

In recent years, much attention has been paid to discrete track media in which adjacent recording tracks are separated by grooves or guard bands formed of a nonmagnetic material to reduce the magnetic interference between the adjacent tracks so as to enable a further increase in the recording density of the magnetic recording media. To manufacture such discrete track media, the patterns of a magnetic layer should desirably be formed by an imprinting method using a stamper. In this case, if patterns of the magnetic layer corresponding to signals for the servo zone as well as the patterns of recording tracks are formed by using the imprinting method, it is possible to eliminate the need for a servo track write process, leading to reduction in costs.

A document refers to a position detection mark (an address section) in the servo zone Sz in a discrete track media (Jpn. Pat. Appln. KOKAI Publication No. 2004-110896). However, the prior art does not consider adverse effects of fine configuration of the position detection mark (the address section) on signal quality.

The present inventors have studied a discrete track media for the quality of address signals obtained from the servo zones. As a result, they have found that, in some cases, quality of the address signals is made insufficient with a high noise level. A probable cause is that, in a case where two magnetic patterns used as address bits on servo zones corresponding to two adjacent recording tracks are arranged so that one corner of one magnetic pattern is almost in point-contact with one corner of the other magnetic pattern, magnetic fluxes are concentrated on the corners of the magnetic patterns. The concentration of the magnetic fluxes may increase a leakage magnetic field, which in turn may increase noise. Further, when the corners of the two magnetic patterns used as address bits are joined together, magnetic signals would be broadened. This makes it difficult to distinguish the two magnetic patterns.

BRIEF SUMMARY OF THE INVENTION

A magnetic recording media according to one aspect of the present invention comprises: a substrate; and a magnetic layer containing magnetic patterns on the substrate, the magnetic layer including data zones to constitute recoding tracks and servo zones, wherein the magnetic patterns of the servo zones being used as address bits, wherein, in a case where two magnetic patterns used as address bits on the servo zones corresponding to two adjacent recording tracks are arranged in such a manner that one corner of one magnetic pattern is closest to one corner of the other magnetic pattern, the corners of the two magnetic patterns are substantially separated from each other.

A magnetic recording apparatus according to another aspect of the present invention comprises: a magnetic recording media comprising a substrate and a magnetic layer containing magnetic patterns on the substrate, the magnetic layer including data zones to constitute recoding tracks and servo zones, wherein the magnetic patterns of the servo zones being used as address bits; and a magnetic head configured to read signals from the magnetic recording media while flying over the magnetic recording media; wherein, in a case where two magnetic patterns used as address bits on the servo zones corresponding to two adjacent recording tracks are arranged in such a manner that one corner of one magnetic pattern is closest to one corner of the other magnetic pattern, the corners of the two magnetic patterns are substantially separated from each other. In the above apparatus, a smallest distance between the two magnetic patterns is at most four times as large as a distance corresponding to an average flying height of the magnetic head.

According to still another aspect of the present invention, there is provided a stamper used to produce the above magnetic recording media using an imprinting method, the stamper comprises patterns of protrusions and recesses corresponding to the magnetic patterns on the magnetic recording layer.

According to yet another aspect of the present invention, there is provided a method for manufacturing a stamper used to produce the above magnetic recording media using an imprinting method, the method comprising: applying a positive or a negative resist to a substrate; placing the substrate on a stage having a rotating mechanism and a moving mechanism for a shaft moving in at least one direction; irradiating the positive or negative resist with a radiation from one point on the shaft to form an address signal using a plurality of exposed or non-exposed portions arranged in a radial direction, in which one or more portions from an end of the plurality of the exposed or the non-exposed portions are omitted; developing the resist; and electroforming a metallic film on the developed substrate and then stripping the metallic film.

BRIEF DESCRIPTION OF THE SEVERAL VIEWS OF THE DRAWING

FIG. 4 is a diagram showing a variation in read signal output obtained with time through simulation of a case in which corners of two adjacent magnetic patterns are separated and a case in which the corners are not separated;

FIGS. 10A, 10B, 10C, 10D, 10E and 10F are sectional views showing a method for manufacturing a magnetic disk in an example of the present invention;

DETAILED DESCRIPTION OF THE INVENTION

Figure 1:
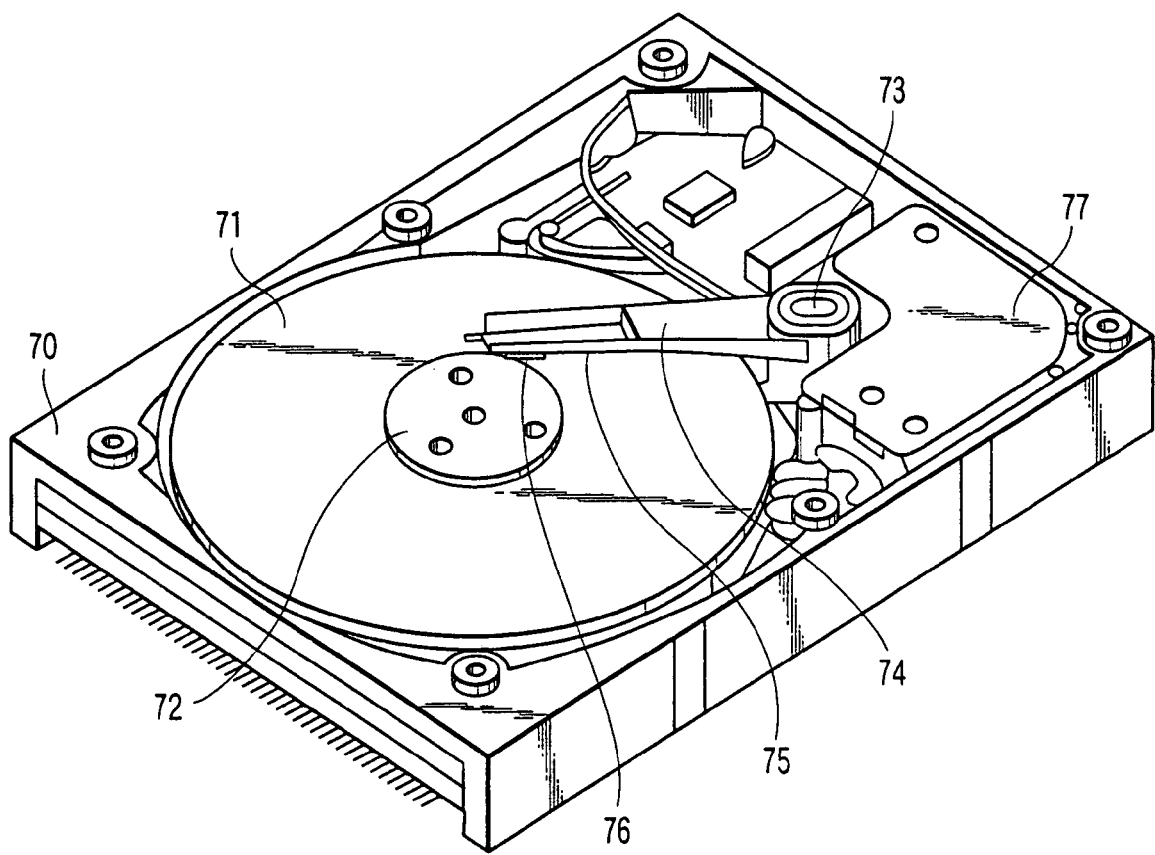
FIG. 1 is a perspective view showing a magnetic recording apparatus according to an embodiment of the present invention.

With reference to FIG. 1, a magnetic recording apparatus according to an embodiment of the present invention will be described. The magnetic recording apparatus comprises a magnetic disk 71, a head slider 76 including a magnetic head, a head suspension assembly (suspension 75 and actuator arm 74) that supports the head slider 76, a voice coil motor (VCM) 77, and a circuit board; all these components are provided inside a chassis 70.

The magnetic disk 71 is mounted on and rotated by a spindle motor 72. Various digital data are recorded to the magnetic disk 71 in a perpendicular magnetic recording system. The magnetic head incorporated in the head slider 76 is a so-called integrated head including a write head of a single pole structure and a read head using a shielded MR read element (GMR film, TMR film, or the like). The suspension 75 is held at one end of the actuator arm 74 to support the head slider 76 so as to face the recording surface of the magnetic disk 71. The actuator arm 74 is attached to a pivot 73. The voice coil motor (VCM) 77 is provided at the other end of the actuator arm 74. The voice coil motor (VCM) 77 drives the head suspension assembly to position the magnetic head at an arbitrary radial position of the magnetic disk 71. The circuit board comprises a head IC to generate driving signals for the voice coil motor (VCM) and control signals for controlling read and write operations performed by the magnetic head.

The magnetic disk used in the present invention is a so-called discrete track media. The discrete track media has a magnetic layer formed on a substrate, in which data zones each including a magnetic pattern constituting a recording track and servo zones each formed between data zones in the track direction and including magnetic patterns used as address bits are contained in the plane of the magnetic layer. These magnetic patterns are separated from one another by grooves or a nonmagnetic material.

Figure 2:
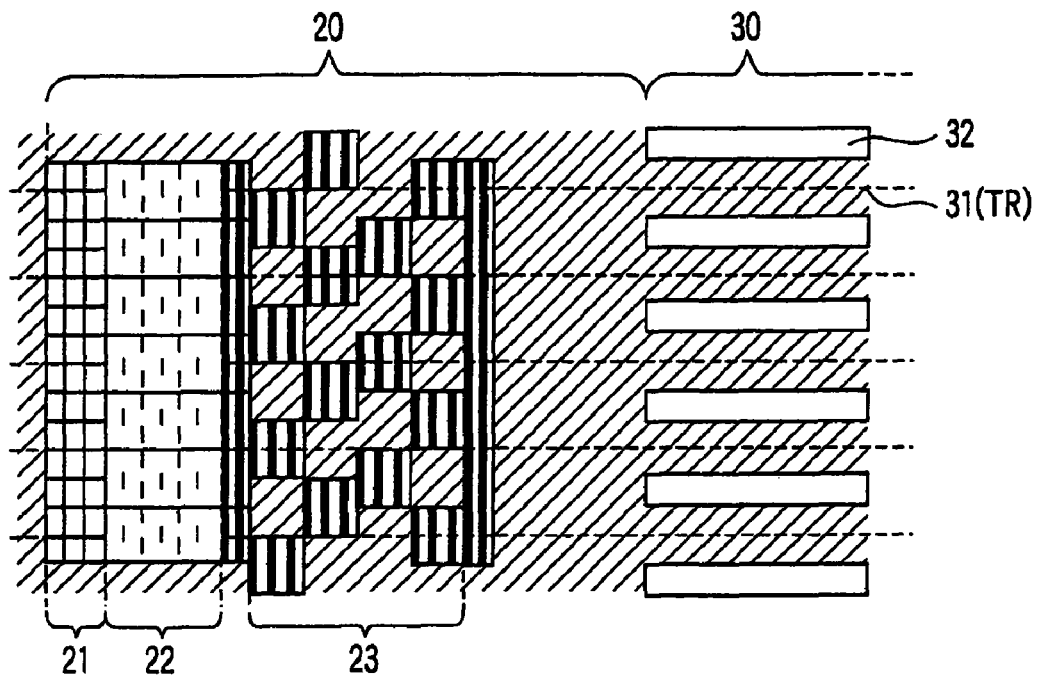
FIG. 2 is a plan view showing an example of magnetic patterns in a magnetic disk according to an embodiment of the present invention.

FIG. 2 shows an example of magnetic patterns formed on the surface of the magnetic disk 71. As shown in FIG. 2, servo zones 20 and data zones 30 are alternately formed in the circumferential direction. The servo zone 20 includes a preamble section 21, an address section 22, and a burst section 23; each of these regions is formed of patterns of the magnetic layer. The servo zone 20 may include a gap section in addition to these sections or the sections may be arranged in a different order or arrangement. The data zones 30 have recording tracks 31 consisting of patterns of the magnetic layer and guard bands 32 consisting of grooves or a nonmagnetic material, the recording tracks 31 and guard bands 32 being alternately formed in the radial direction. In such a microscopic range as shown in FIG. 2, the radial direction and the circumferential direction are depicted such that they are orthogonal to each other. However, the servo zones may be formed like arcs in the magnetic disk as a whole so as to correspond with the locus of the actuator arm of the head slider. Further, the patterns of the magnetic layer may vary depending on the radial position.

In an embodiment of the present invention, in a case where two magnetic patterns used as address bits on the servo zones corresponding to two adjacent recording tracks are arranged in such a manner that one corner of one magnetic pattern is closest to one corner of the other magnetic pattern, the corners of the two magnetic patterns are substantially separated.

Figure 3:
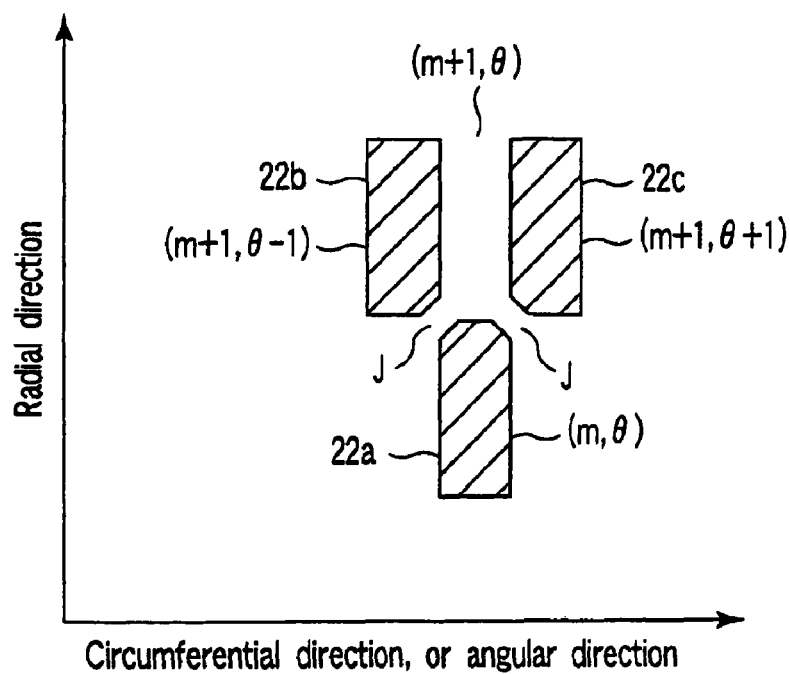
FIG. 3 is a plan view showing separated magnetic patterns used as address bits in a magnetic disk according to an embodiment of the present invention.

With reference to FIG. 3, a configuration of the magnetic patterns of the address section in the servo zone 22 will be described. FIG. 3 shows a magnetic pattern 22a used as an address bit for a recording track m and magnetic patterns 22b and 22c used as address bits for the adjacent recording track m+1. The angular positions of 22a, 22b, and 22c are θ, θ−1, and θ+1, respectively. One corner of the magnetic pattern 22a is arranged closest to one corner of the magnetic pattern 22b, and the corners of the magnetic patterns 22a and 22b are separated from each other through a separation J. Likewise, one corner of the magnetic pattern 22a is arranged closest to one corner of the magnetic pattern 22c, and the corners of the magnetic patterns 22a and 22c are separated from each other through a separation J.

The positional relationship between the magnetic patterns used as address bits as shown in FIG. 3 is generalized as follows. The positional relationship between the magnetic patterns 22a and 22b is such that a signal for the track m and angular position θ differs from a signal for the track m+1 and angular position θ and from a signal for the track m and angular position θ−1 and that the signal for the track m and angular position θ is the same as a signal for the track m+1 and angular position θ−1. The positional relationship between the magnetic patterns 22a and 22c is such that the signal for the track m and angular position θ differs from the signal for the track m+1 and angular position θ and from a signal for the track m and angular position θ+1 and that the signal for the track m and angular position θ is the same as a signal for the track m+1 and angular position θ+1. The two magnetic patterns having such a positional relationship have their corners arranged closest to each other. In this case, one corner of the magnetic pattern (22a) with the track m and angular position θ is substantially separated from one corner of the magnetic pattern (22b) with the track m+1 and angular position θ−1 or the magnetic pattern (22c) with the track m+1 and angular position θ+1.

When the corners of two adjacent magnetic patterns used as address bits are separated from each other as described above, concentration of magnetic fluxes at the corners of the magnetic patters is reduced. This reduces noise to provide high-quality address signals. Such knowledge has been provided through simulation. The simulation executed by the present inventors will be described below with reference to FIG. 4.

In FIG. 4, (1), (2) and (3) shown in the right show three types of magnetic patterns in which their closest corners are arranged in different manners. In (1), (2) and (3), shown in the right of FIG. 4, the transverse direction corresponds to the radial direction, and the direction crossing the above direction corresponds to the circumferential direction. In (1), the corners are in contact at an ideal point. In (2), the corners are joined. In (3), the corners are separated (present invention).

The graph in FIG. 4 shows the relationship between time and read signal output obtained when the head travels from below (track m) to above (track m+1) in the radial direction. The simulation is executed under the conditions that the head flied above the magnetic disk rotating at 4,200 rpm, at a radial position of 20 mm. In the graph, (a) denotes the case in which the head is located below the magnetic pattern for the track m, (b) denotes the case in which the head is located midway between the magnetic pattern for the track m and the magnetic pattern for the track m+1, and (c) denotes the case in which the head is located above the magnetic pattern for the track m+1.

If a variation in magnetic pattern is determined on the basis of read signals, a reference read signal is obtained when the read head is located midway between two adjacent magnetic patterns. In the pattern (1) in which the corners are in contact at the ideal point, the two magnetic patterns can be sufficiently distinguished from each other based on the waveform of the read signals. Here, the expression "in contact at the ideal point" means that "the corners are in contact at a point having no width (the point is ideal in this sense)" as shown as (1) in FIG. 4. In the joined pattern (2), a magnetic field from the joined portion is sensed to add noise to the read signals. Thus, the resulting signal deviates greatly from the reference signal, thus increasing factors of error for pattern determination. In contrast, in the separated pattern (3), a read signal is obtained which is at a level equal to or slightly higher than that of the signal obtained with the pattern (1), in which the corners are in contact at the ideal point. Consequently, almost no noise is added to the signals in the case of (3), thus enabling the two magnetic patterns to be appropriately distinguished from each other.

Figure 5:
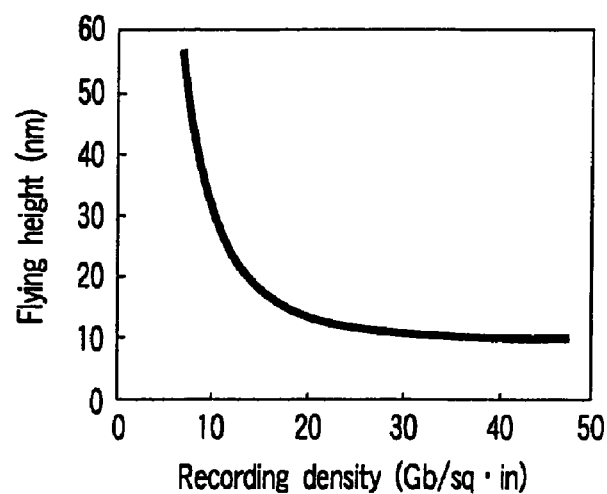
FIG. 5 is a diagram schematically showing the relationship between the recording density of a magnetic disk and the flying height of a magnetic head.
Figure 6:
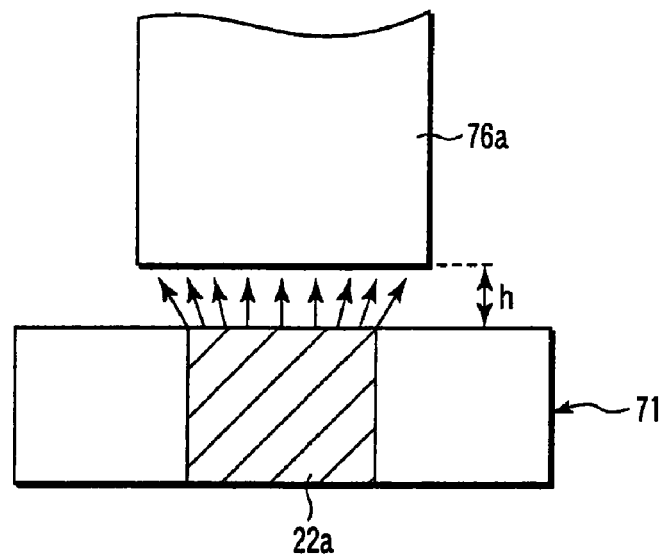
FIG. 6 is a schematic diagram showing a state that a magnetic head flies over a magnetic disk.
Figure 7:
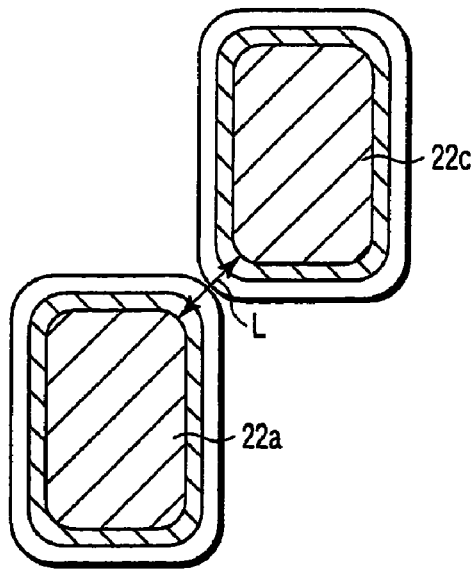
FIG. 7 is a schematic diagram showing a region in which a magnetic flux spreads around the peripheries of magnetic patterns.

In an embodiment of the present invention, the smallest distance L of a separation between two magnetic patterns is preferably set at most four times as large as the distance corresponding to the average flying height h of the magnetic head. Here, the average flying height h of the magnetic head is substantially determined by the recording density of the magnetic disk. FIG. 5 schematically shows the relationship between the recording density of the magnetic disk and the flying height of the magnetic head. With reference to FIGS. 6 and 7, the reason why the smallest distance L is set at most four times as large as the average flying height h of the magnetic head will be described. FIG. 6 is a schematic diagram showing that a magnetic head 76a is flying over the magnetic disk 71. A magnetic flux from the magnetic pattern 22a reaches the magnetic head 76a with spread over an area larger than a physical area of the magnetic pattern 22a. The degree of spread of the magnetic flux is as large as the average flying height h of the magnetic head measured from the end of the magnetic pattern 22a. FIG. 7 shows the region in which the magnetic flux spreads around the peripheries of two magnetic patterns. As can be seen from the figure, if the smallest distance of a separation between two magnetic patterns is more than four times as large as the distance corresponding to the average flying height h of the magnetic head, when the head passes across the separation between the two magnetic patterns, signal intensity may decrease or the magnetic head erroneously determines that there is no bit. In contrast, if the condition of $0 < L \leq 4h$ is satisfied, magnetic fluxes from two magnetic patterns overlap adequately, taking the spread of the magnetic fluxes from the magnetic patterns to the flying magnetic head into consideration. In addition, almost no noise is added to the read signals.

Figure 8:
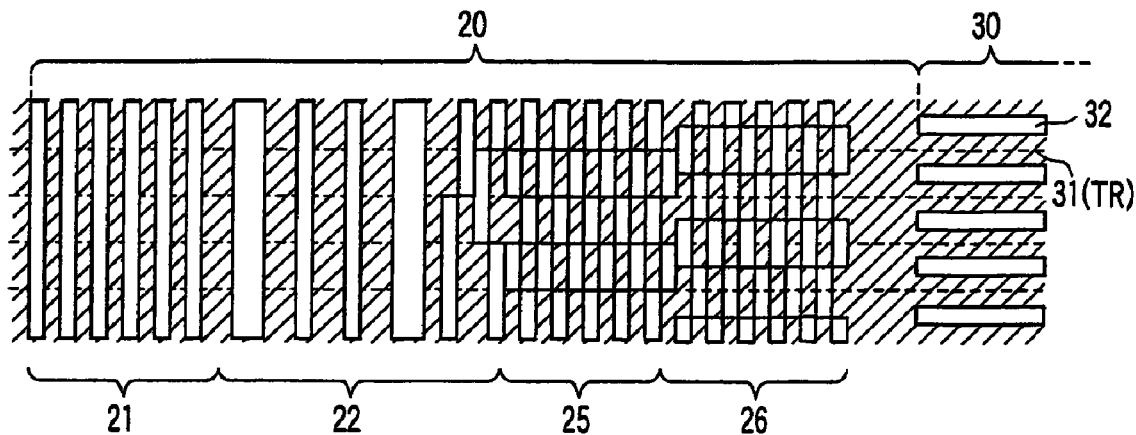
FIG. 8 is a plan view showing another example of magnetic patterns in a magnetic disk according to an embodiment of the present invention.

FIG. 8 shows another example of the magnetic patterns formed on the surface of the magnetic disk 71. In FIG. 2, a burst ABCD is provided as one section. In contrast, in FIG. 8, the burst section is divided into a first burst section (AB) 25 and a second burst section (CD) 26. In the first burst section 25 and the second burst section 26, shown in FIG. 8, adjacent two magnetic patterns may possibly be arranged such that one corner of one magnetic pattern is closest to one corner of the other magnetic pattern, as in the case of the address section 22. Accordingly, a magnetic disk having such servo zones as shown in FIG. 8, corners of two magnetic patterns are preferably separated from each other as shown in FIG. 3, not only in the address section 22 but also in the first burst section 25 and the second burst section 26.

In order to separate the corners of the magnetic patterns to each other as shown in FIG. 3, imprinting is carried out using a stamper having patterns of protrusions and recesses corresponding to the magnetic patterns. The stamper has protrusion patterns in which portions corresponding to the separations between the corners of the magnetic patterns in the magnetic recording media are joined together.

Examples of the present invention will be described below.

EXAMPLE

In accordance with the processes shown in FIGS. 9A to 9F and 10A to 10F, a magnetic disk according to the present example is produced. The magnetic disk has a track density of 100 kTPI (track per inch) in a data zone of a radius range between 5 mm and 10 mm. One track includes 120 sectors. One sector corresponds to 10,000 bits.

Figure 11:
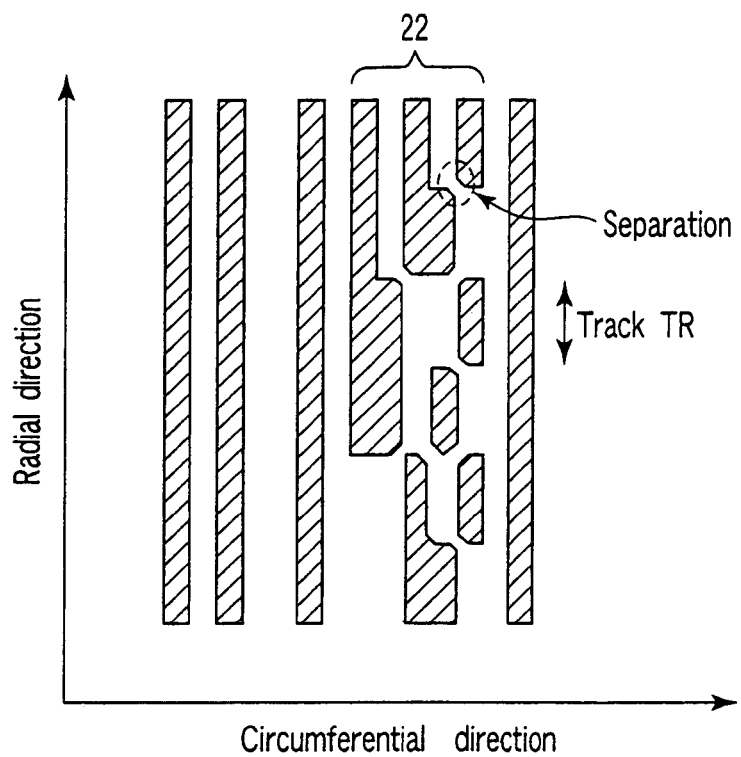
FIG. 11 is a plan view showing separated magnetic patterns used as address bits in a magnetic disk in an example of the present invention.

FIG. 11 shows a part of the address section 22, which is a part of the servo zone in one sector. This figure shows that, where two magnetic patterns used as address bits are arranged in such a manner that one corner of one magnetic pattern is closest to one corner of the other, the corners of the two magnetic patterns are separated from each other through the separation J. The present example is designed so that the smallest distance of the separation J between the address bits is 40 nm. The distance corresponding to the average flying height of the magnetic head is 15 nm.

Figure 12:
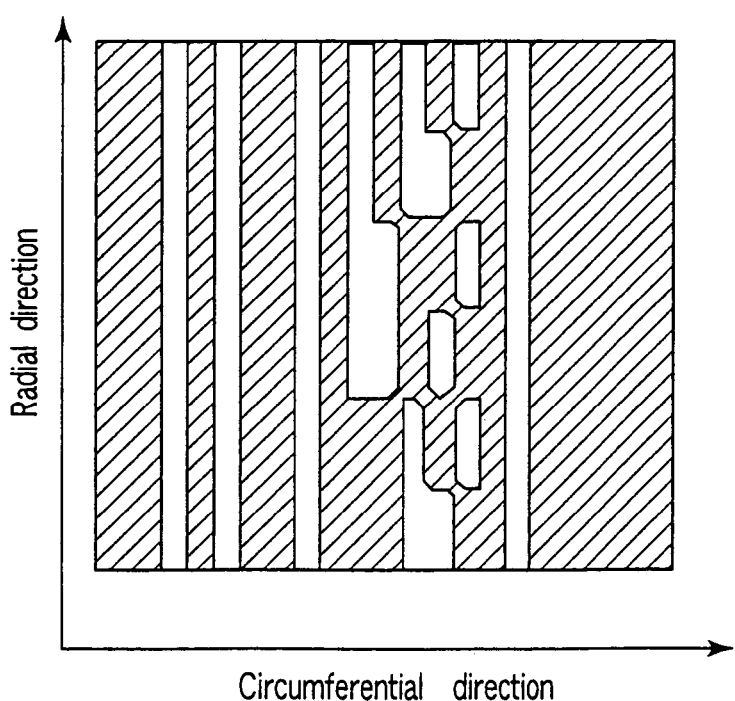
FIG. 12 is a plan view showing protrusion patterns of a stamper used to manufacture the magnetic shown in FIG. 11.

To manufacture a magnetic disk having such servo zones, imprinting is carried out using a stamper having patterns of protrusions and recesses corresponding to the magnetic patterns on the magnetic disk, as shown in FIG. 12. In the patterns of protrusions and recesses of the magnetic layer formed by imprinting and subsequent processing, the recesses may be filled with a nonmagnetic material so as to flatten the surface thereof.

A method for manufacturing the magnetic disk in this Example will be described in detail.

First, a stamper is produced using the method shown in FIGS. 9A to 9F.

Figure 9A:
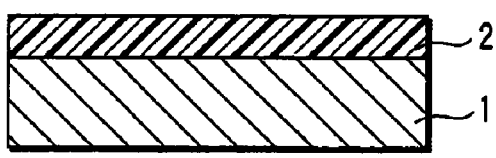
FIGS. 9A, 9B, 9C, 9D, 9E and 9F are sectional views showing a method for manufacturing a stamper used in an example of the present invention.

As shown in FIG. 9A, a 6-inch Si wafer 1, which is used as a substrate for a master disk of a stamper, is surface-treated with hexamethyl disilazane (HMDS). On the other hand, a resist ZEP-520 manufactured by ZEON Corporation is diluted twice with anisole, followed by filtering with a 0.2-μm membrane filter. The Si wafer 1 is spin-coated with the resist solution, which is then pre-baked at 200° C. for three minutes, thereby forming the resist 2 with a thickness of about 0.1 μm.

Figure 9B:
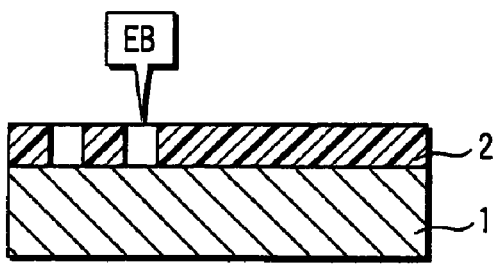

As shown in FIG. 9B, desired patterns are drawn directly on the resist 2 on the Si wafer 1 at an acceleration voltage of 50 kV using electron beam lithography equipment having a ZrO/W thermal field emission type electron gun emitter. In the drawing process, a signal source is used that generates signals for forming servo patterns, burst patterns, address patterns and track patterns, signals send to a stage driving system for the drawing equipment (a so-called X-θ stage driving system having a moving mechanism and a rotating mechanism for a shaft moving in at least one direction), and signals for controlling electron beam deflection in a synchronized manner. In this process, the drawing is carried out such that, in a site where two magnetic patterns used as address bits on the servo zones corresponding to two adjacent recording tracks are arranged in such a manner that one corner of one magnetic pattern is closest to one corner of the other magnetic pattern, the corners of the two magnetic patterns are substantially separated from each other. During the drawing process, the stage is rotated at a constant linear velocity (CLV) of 500 mm/s and moved in the radial direction. The electron beam is deflected for each rotation to draw track regions into concentric circles. The stage is moved by 25.4 nm per rotation so that one track with a width corresponding to that of one address bit is formed by 10 rotations. The signals of the electron beam lithography equipment are processed so that when two magnetic patterns used as address bits are arranged in such a manner that one corner of one magnetic pattern is closest to one corner of the other magnetic pattern, exposure is not carried out for the formation of the closest sides of the patterns.

The above process will be generally described below. An imprint substrate is coated with a positive resist. The substrate is placed on a stage having a moving mechanism and a rotating mechanism for a shaft moving in at least one direction. The positive resist is exposed to light emitted from one position on the shaft. Here, in the process of forming one address signal with a plurality of exposure portions located in the radial direction, one or more exposure portions from the end of the plurality of exposure portions are omitted.

For a negative resist, in the process of forming one address signal with a plurality of non-exposure portions located is the radial direction, one or more non-exposure portions from the end of the plurality of non-exposure portions are omitted.

Figure 9C:
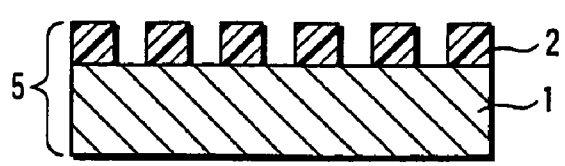

As shown in FIG. 9C, the Si wafer 1 is immersed in ZED-N50 (manufactured by ZEON Corporation) for 90 seconds to develop the resist 2. The wafer is then immersed and rinsed in ZMD-B (manufactured by ZEON Corporation) for 90 seconds. The wafer is then dried by air blow to produce a resist master 5.

Figure 9D:
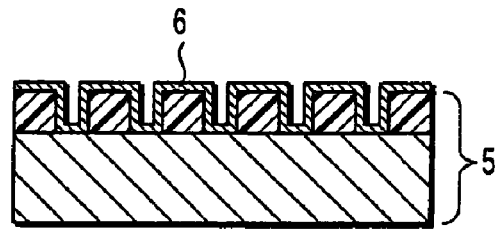

As shown in FIG. 9D, a conductive film 6 consisting of Ni is deposited on the resist master 5 by sputtering. Specifically, pure nickel is used as a target and a chamber is evacuated to a vacuum of $8 \times 10^{-3}$ Pa. An argon gas is introduced into the chamber by which the pressure of the chamber is adjusted to 1 Pa. In the chamber, 400-W DC power is applied to carry out sputtering for 40 seconds, thereby depositing a conductive film 6 with a thickness of about 30 nm.

Figure 9E:
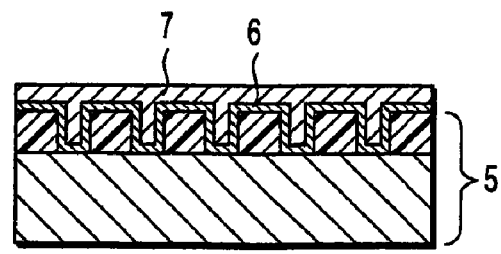

As shown in FIG. 9E, the resist master 5 with the conductive film 6 is immersed in a nickel sulfamate plating solution (NS-160 manufactured by Showa Chemical Industry Co., Ltd.). The resist master 5 is electroformed for 90 minutes to form a Ni electroformed film 7 with a thickness of about 300 µm. Conditions for the electroforming are as follows:

nickel sulfamate: 600 g/L,
boric acid: 40 g/L,
surfactant (sodium lauryl sulfate): 0.15 g/L,
liquid temperature: 55° C.,
pH: 4.0,
current density: 20 A/dm$^2$.

Figure 9F:
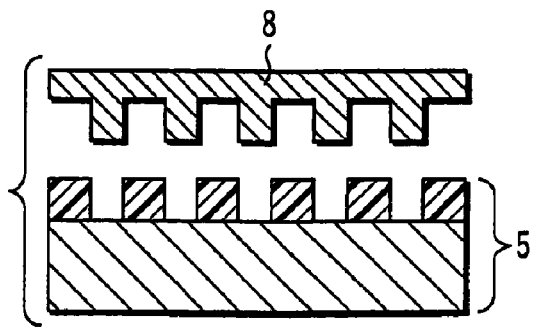

As shown in FIG. 9F, the electroformed film 7 and conductive film 6 are peeled off from the resist master 5 with a resist residue adhered thereon. The resist residue is removed by oxygen plasma ashing. Specifically, an oxygen gas is introduced into the chamber at 100 ml/min and the pressure in the chamber is adjusted to 4 Pa. Then, in the chamber, 100-W power is applied to carry out plasma ashing for 20 minutes.

Thus, a father stamper including the conductive film 6 and electroformed film 7 is provided. Subsequently, the unnecessary portions of the farther stamper are punched off using a metal blade to obtain an imprint stamper 8. The stamper 8 has the patterns shown in FIG. 12. In this stamper 8, corners of two patterns corresponding to address bits are joined together (the patterns are almost opposite to the address bits).

Then, a magnetic disk is manufactured by the method shown in FIGS. 10A to 10F.

As shown in FIG. 10A, the stamper 8 is subjected to ultrasonic cleaning with acetone for 15 minutes. The stamper 8 is treated as described below in order to improve releasability in imprinting. A solution of fluoroalkylsilane [$CF_3(CF_2)_7CH_2CH_2Si(OMe)_3$] (TSL8233 manufactured by GE Toshiba Silicones) diluted with ethanol to a concentration of 5% is prepared. The stamper 8 is immersed in the solution for 30 minutes, followed by blowing away a residual solution using a blower, and then the stamper 8 is annealed at 120° C. for one hour.

On the other hand, a magnetic recording layer 12 is deposited by sputtering on a disk substrate 11 consisting of doughnut-shaped glass with a diameter of 0.85 inches. The magnetic recording layer 12 is spin-coated with a resist 15 (S1801 manufactured by Rohm and Haas) at a rotating speed of 4,000 rpm.

As shown in FIG. 10B, the stamper 8 is brought into contact with the resist 15 on the surface of the disk substrate 11 and pressed at 1,800 bar for one minute to transfer the patterns of the stamper 8 to the resist 15. The resist 15 to which the patterns had been transferred is irradiated with UV for five minutes, and then baked at 160° C. for 30 minutes. With the process for forming protrusions and recesses by imprinting, resist residues remain at the bottoms of the recesses.

As shown in FIG. 10C, the resist residues at the bottoms of the recesses are removed by reactive ion etching (RIE) with an oxygen gas. As shown in FIG. 10D, the magnetic recording layer 12 is etched by Ar ion milling using the patterns of the resist 15 as a mask. As shown in FIG. 10E, the patterns of the resist 15 are stripped away by oxygen RIE. As shown in FIG. 10F, a carbon protective layer 13 is deposited on the entire surface of the magnetic recording layer 12. Subsequently, a lubricant is applied to the magnetic disk produced. The recesses in the stamper 8, shown in FIG. 10A, correspond to the projected magnetic patterns on the media shown in 10F.

In the above magnetic disk media, the magnetic recording layer 12 is etched to its bottom in portions where the mask of the resist 15 is not present as shown in FIG. 10D. However, a media having a magnetic recording layer 12 with protrusions and recesses may be manufactured by stopping Ar ion milling before etching proceeds to the bottom of the magnetic recording layer 12. Alternatively, a media may be manufactured by a method of, for example, applying a resist on the substrate without providing the magnetic layer 12, imprinting a stamper on the resist on the substrate, etching the substrate to form protrusions and recesses on the substrate, and depositing a magnetic film on the substrate. Further, in any case including the above, the grooves may be filled with any nonmagnetic material.

One thousand magnetic disks are manufactured by the method including the imprinting process using one stamper. Magnetic recording apparatuses are assembled using magnetic disks produced every appropriate number of imprinting processes. The magnetic recording apparatuses are tested for performance by detecting address signals. As a result, for all the magnetic disks including the one produced in 1,000-th imprinting process, desired address signals are obtained within the range between the inner peripheral position and the outer peripheral position.

COMPARATIVE EXAMPLE

In the Comparative Example, conditions for electron beam lithography are varied from those in the method for manufacturing the stamper in the above Example. That is, in the electron beam lithography, when two protrusion patterns in sections corresponding to the address sections on the servo zones are arranged in such a manner that one corner of one protrusion pattern is closest to one corner of the other protrusion pattern, electron beams for drawing these two protrusion patterns are applied so as to somewhat overlap with each other, without performing a process of omitting exposure at the edges of the patterns. In the other respects, the processes similar to those in the above Example are used to produce a stamper and then to manufacture a magnetic disk using the resultant stamper.

Figure 13:
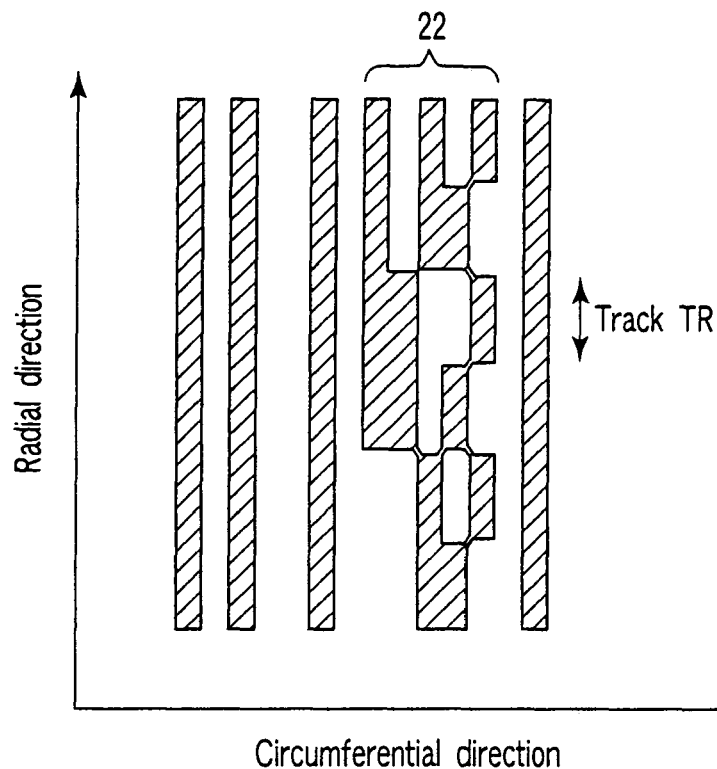
FIG. 13 is a plan view showing magnetic patterns used as address bits in a magnetic disk in a comparative example.
Figure 14:
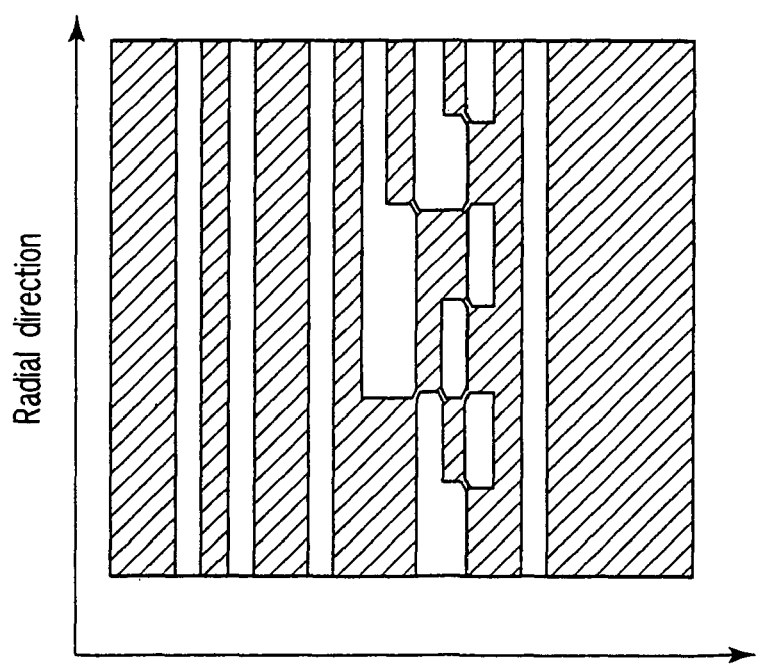
FIG. 14 is a plan view showing protrusion patterns of a stamper used to manufacture the magnetic disk shown in FIG. 13.

FIG. 14 shows the protrusion patterns of the stamper used in the Comparative Example. As shown in this figure, the two adjacent protrusion patterns of the stamper are formed such that their corners are almost in point-contact with each other. FIG. 13 shows the magnetic patterns of a magnetic disk according to the Comparative Example manufactured using the stamper. As shown in this figure, the two adjacent magnetic patterns of the magnetic disk are formed such that their corners are almost in point-contact with each other.

One thousand magnetic disks are manufactured by the method including the imprinting process using one stamper, as in the case of Example. Magnetic recording apparatuses are assembled using magnetic disks produced every appropriate number of imprinting processes. The magnetic recording apparatuses are tested for performance by detecting address signals.

As a result, with the 500-th magnetic disk, noise in address signals increases or an address signal error is detected particularly on an inner peripheral portion. The stamper after the use for processing the 500-th magnetic disk is examined with an atomic force microscope (AFM). Then, no defect is detected in the protrusion patterns corresponding to the address bits. The reason of increase in the noise is probably because, in the inner peripheral portion, a bit length (a length of one bit in the circumferential direction) is shorter, so that influence of noise from the contact point between address bits is more marked than that in the outer peripheral portion. Further, with the 1,000-th magnetic disk, address signal errors occur in the entire disk from the inner peripheral portion to the outer peripheral portion. The stamper after the use for processing the 1,000-th magnetic disk is examined with AFM. Then, defects are observed in the contact points between address bits in the protrusion patterns corresponding to the address sections. This is probably because repeated imprinting operations cause the portion between the address bits to be deformed to be thicker, resulting in the adverse effect of noise from the contact points between the address bits.

Hereinafter, another method for manufacturing a magnetic recording media according to an embodiment of the present invention, and materials used for the layers and a stacked structure for the layers in a magnetic recording media according to an embodiment of the present invention will be described.

<Imprinting Method>

Besides the method described in Example with reference to FIGS. 9A to 9F and 10A to 10F, a discrete track media can be manufactured using a method of forming protrusions and recesses on the substrate itself similarly using a stamper and then depositing a magnetic material on the substrate. The magnetic head receives magnetic signals mainly from the magnetic material on the protrusions which are arranged at nearest positions to the head. Regardless of whatever method is used to produce the media, the recesses may be filled with a magnetic material, the recesses may be grooves as they are, or the recesses may be filled with a nonmagnetic material. Although not very preferable in terms of mass productivity and costs, heat, light or ultrasonic wave may be applied when protrusions and recesses are formed with a stamper.

<Magnetic Disk Substrate>

The magnetic disk substrate may be, for example, a glass substrate, an Al-based alloy substrate, a ceramic substrate, a carbon substrate, an Si single-crystal substrate having an oxidized surface, or any of these substrates having an NiP layer on its surface. The glass substrate may be formed of amorphous glass or crystallized glass. The amorphous glass includes soda lime glass, aluminosilicate glass, or the like. The crystallized glass includes lithium-based crystallized glass or the like. The ceramic substrate includes a sintered body mainly formed of aluminum oxide, aluminum nitride, silicon nitride, or the like, or a material obtained by fiber-reinforcing the sintered body. Plating or sputtering is used to form an NiP layer on the surface of the substrate.

<Soft Magnetic Underlayer>

When a perpendicular magnetic recording media is produced, so-called perpendicular double layer media in which a perpendicular magnetic recording layer is formed on a soft magnetic underlayer (SUL) is used. The soft magnetic underlayer in the perpendicular double layer media is provided so as to pass a recording magnetic field from a recording magnetic pole through this layer and to return the recording magnetic field to a return yoke arranged near the recording magnetic pole. That is, the soft magnetic underlayer provides a part of the function of the write head, serving to apply a steep perpendicular magnetic field to the recording layer so as to improve recording efficiency.

The soft magnetic underlayer is formed of a high permeability material containing at least one of Fe, Ni, and Co. Such materials include, an FeCo-based alloy such as FeCo and FeCoV, an FeNi-based alloy such as FeNi, FeNiMo, FeNiCr and FeNiSi, an FeAl- and FeSi-based alloy such as FeAl, FeAlSi, FeAlSiCr, FeAlSiTiRu and FeAlO, an FeTa-based alloy such as FeTa, FeTaC and FeTaN, and an FeZr-based alloy such as FeZrN.

The soft magnetic underlayer may be formed of a material having a microcrystalline structure or a granular structure containing fine grains dispersed in a matrix such as FeAlO, FeMgO, FeTaN, and FeZrN, each containing 60 at % or more of Fe.

The soft magnetic underlayer may be formed of other materials such as a Co alloy containing Co and at least one of Zr, Hf, Nb, Ta, Ti and Y. The material preferably contains 80 at % or more of Co. An amorphous layer is easily formed when such a Co alloy is deposited by sputtering. The amorphous soft magnetic material exhibits very excellent soft magnetism because of free of magnetocrystalline anisotropy, crystal defects and grain boundaries. Further, the use of the amorphous soft magnetic material reduces noise from the media. Preferred amorphous soft magnetic materials include, for example, a CoZr-, CoZrNb- and CoZrTa-based alloys.

Another underlayer may be provided under the soft magnetic underlayer in order to improve the crystalinity of the soft magnetic underlayer or the adhesion to the substrate. Materials for the underlayer include Ti, Ta, W, Cr, Pt, and an alloy thereof, and oxide and nitride containing the above metal.

An intermediate layer consisting of a nonmagnetic material may be provided between the soft magnetic underlayer and the perpendicular magnetic recording layer. The intermediate layer serves to disrupt exchange coupling interaction between the soft magnetic underlayer and the recording layer and to control the crystalinity of the recording layer. Materials for the intermediate layer include Ru, Pt, Pd, W, Ti, Ta, Cr, Si and an alloy thereof, and oxide and nitride containing the above metal.

To prevent spike noise, the soft magnetic underlayer may be divided into layers that are antiferromagnetically coupled with each other through a Ru layer with a thickness of 0.5 to 1.5 nm sandwiched therebetween. Alternatively, the soft magnetic layer may be exchange-coupled with a pinning layer formed of a hard magnetic material with in-plane anisotropy, such as CoCrPt, SmCo and FePt, or an antiferromagnetic material such as IrMn and PtMn. In this case, to control the exchange coupling force, a magnetic layer such as Co or a nonmagnetic layer such as Pt may be stacked on the Ru layer.

<Perpendicular Magnetic Recording Layer>

The perpendicular magnetic recording layer is formed of, for example, a material mainly containing Co, containing at least Pt, containing Cr as required, and further containing an oxide (such as silicon oxide and titanium oxide). In the perpendicular magnetic recording layer, magnetic crystal grains preferably form a columnar structure. In a perpendicular magnetic recording layer having such a structure, the magnetic crystal grains have favorable orientation and crystality, making it possible to provide a signal-to-noise ratio (SNR) suitable for high-density recording. The amount of oxide is important for obtaining the above structure. The content of the oxide in the total amount of Co, Pt and Cr is preferably 3 mol % or more and 12 mol % or less, more preferably 5 mol % or more and 10 mol % or less. If the content of the oxide in the perpendicular magnetic recording layer is within this range, the oxide is precipitated around the magnetic grains, making it possible to isolate the magnetic grains and to reduce their sizes. If the content of the oxide exceeds the above range, the oxide remains in the magnetic grains to degrade the orientation and crystalinity. Moreover, the oxide is precipitated over and under the magnetic grains to prevent formation of the columnar structure in which the magnetic grains penetrate the perpendicular magnetic recording layer in the perpendicular direction. On the other hand, if the content of the oxide is less than the above range, the isolation of the magnetic grains and the reduction in their sizes are insufficient. This increases noise in reading data, making it impossible to obtain a signal-to-noise ratio (SNR) suitable for high-density recording.

The content of Pt in the perpendicular magnetic recording layer is preferably 10 at % or more and 25 at % or less. When the Pt content is within this range, the perpendicular magnetic recording layer provides a required uniaxial magnetic anisotropy constant Ku. Moreover, the magnetic grains exhibit good cyrstalinity and orientation, resulting in thermal fluctuation characteristics and read/write characteristics suitable for high-density recording. If the Pt content exceeds the above range, a layer of an fcc structure may be formed in the magnetic grains to degrade the crystalinity and orientation. On the other hand, if the Pt content is less than the above range, it is impossible to obtain a uniaxial magnetic anisotropy constant Ku and thus thermal fluctuation characteristics suitable for high-density recording.

The content of Cr in the perpendicular magnetic recording layer is preferably 0 at % or more and 16 at % or less, more preferably 10 at % or more and 14 at % or less. When the Cr content is within this range, high magnetization can be maintained without reduction in uniaxial magnetic anisotropy constant Ku. This brings sufficient read/write characteristics and thermal fluctuation characteristics suitable for high-density recording. If the Cr content exceeds the above range, the constant Ku of the magnetic grains decreases to degrade the thermal fluctuation characteristics and the crystalinity and orientation of the magnetic grains. As a result, the read/write characteristics may be degraded.

The perpendicular magnetic recording layer may contain not only Co, Pt, Cr and an oxide but also one or more additive elements selected from the group consisting of B, Ta, Mo, Cu, Nd, W, Nb, Sm, Tb, Ru and Re. These additive elements enable to facilitate reduction in the sizes of the magnetic grains or to improve the crystalinity and orientation. This in turn makes it possible to provide read/write characteristics and thermal fluctuation characteristics more suitable for high-density recording. The total content of these additive elements is preferably 8 at % or less. If the total content exceeds 8 at %, a phase other than a hcp phase is formed in the magnetic grains. This disturbs crystalinity and orientation of the magnetic grains, making it impossible to provide read/write characteristics and thermal fluctuation characteristics suitable for high-density recording.

Other materials for the perpendicular magnetic recording layer include a CoPt-based alloy, a CoCr-based alloy, a CoPtCr-based alloy, CoPtO, CoPtCrO, CoPtSi and CoPtCrSi. The perpendicular magnetic recording layer may be formed of a multilayer film containing a film of an alloy mainly including an element selected from the group consisting of Pt, Pd, Rh and Ru and a Co layer. The perpendicular magnetic recording layer may be formed of a multilayer film such as CoCr/PtCr, CoB/PdB and CoO/RhO, which are prepared by adding Cr, B or O to each layer of the above multilayer film.

The thickness of the perpendicular magnetic recording layer preferably ranges between 5 nm and 60 nm, more preferably between 10 nm and 40 nm. A perpendicular magnetic recording layer having a thickness within this range is suitable for high-density recording. If the thickness of the perpendicular magnetic recording layer is less than 5 nm, read output tends to be so low that a noise component becomes relatively high. On the other hand, when the thickness of the perpendicular magnetic recording layer exceeds 40 nm, read output tends to be so high as to distort waveforms. The coercivity of the perpendicular magnetic recording layer is preferably 237,000 A/m (3,000 Oe) or more. If the coercivity is less than 237,000 A/m (3,000 Oe), the thermal fluctuation characteristics may be degraded. The perpendicular squareness of the perpendicular magnetic recording layer is preferably 0.8 or more. If the perpendicular squareness is less than 0.8, the thermal fluctuation resistance tends to be degraded.

<Protective Layer>

The protective layer serves to prevent corrosion of the perpendicular magnetic recording layer and to prevent damage to the media surface when the magnetic head comes into contact with the media. Materials for the protective layer include, for example, C, $SiO_2$ and $ZrO_2$. The protective layer preferably has a thickness of 1 to 10 nm. When the thickness of the protective layer is within this range, the distance between the head and the media can be reduced. This is suitable for high-density recording.

<Lubricant Layer>

The lubricant may be formed of, for example, perfluoropolyether, fluorinated alcohol or fluorinated carboxylic acid.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording medium comprising:
    a substrate; and
    a magnetic layer containing magnetic patterns formed on the substrate and isolated from each other by a nonmagnetic material, the magnetic layer including data zones comprising recording tracks and servo zones, the magnetic patterns of the servo zones being used as address bits,
    wherein, in a case in which first and second rectangular magnetic patterns used as address bits on the servo zones corresponding to first and second adjacent recording tracks are arranged in such a manner that one corner of the first magnetic pattern is closest to one corner of the second magnetic pattern in a direction of a diagonal line and two sides forming the corner of each of the first and second magnetic patterns are in contact with the nonmagnetic material,
    wherein the closest corners of the first and second magnetic patterns are substantially separated from each other without forming point contact and the first magnetic pattern includes an edge which is substantially aligned in a track direction with an edge of the second magnetic pattern, and
    wherein the magnetic patterns comprise a soft magnetic underlayer and a magnetic recording layer formed on the soft magnetic underlayer.

2. The magnetic recording medium according to claim 1, wherein the servo zones include a preamble section, an address section and a burst section.

3. The magnetic recording medium according to claim 1, further comprising a protective layer on the magnetic recording layer.

* * * * *